(12) United States Patent
Shambeau et al.

(10) Patent No.: US 11,828,394 B2
(45) Date of Patent: Nov. 28, 2023

(54) EXPANSION AND MOVEMENT JOINTS (71) Applicant: Durr Universal, Inc., Stoughton, WI (US)

(72) Inventors: Adam Joseph Shambeau, Stoughton, WI (US); Matthew Mark Holschuh, Fitchburg, WI (US); Jesse Alan Peterson, Stoughton, WI (US); Bradley Brian Pedersen, Stoughton, WI (US); Patrick John Higgins, Stoughton, WI (US)

(73) Assignee: Durr Universal, Inc., Stoughton, WI (US)

( * ) Notice: Subject to any disclaimer, the term of this patent is extended or adjusted under 35 U.S.C. 154(b) by 0 days.

(21) Appl. No.: 17/256,936

(22) PCT Filed: Jun. 28, 2019

(86) PCT No.: PCT/US2019/039708
§ 371 (c)(1),
(2) Date: Dec. 29, 2020

(87) PCT Pub. No.: WO2020/009913
PCT Pub. Date: Jan. 9, 2020

(65) Prior Publication Data
US 2021/0270401 A1 Sep. 2, 2021

Related U.S. Application Data

(60) Provisional application No. 62/694,275, filed on Jul. 5, 2018.

(51) Int. Cl.
*F16L 5/10* (2006.01)
*F16L 27/12* (2006.01)

(52) U.S. Cl.
CPC .............. *F16L 27/125* (2013.01); *F16L 5/10* (2013.01)

(58) Field of Classification Search
CPC ....... F16L 27/10; F16L 27/1021; F16L 27/12; F16L 3/20; F16L 3/18; F16L 51/00; F16L 47/18; F16L 55/035
See application file for complete search history.

(56) References Cited

U.S. PATENT DOCUMENTS 2,355,742 A * 8/1944 Morehouse ........... F16L 55/035
248/68.1
2,535,288 A * 12/1950 Honkanen ................. F16L 5/08
277/580

(Continued)

FOREIGN PATENT DOCUMENTS

DE 4119684 A1 * 12/1992 .......... F16L 27/1004
DE 10355213 6/2005

(Continued)

OTHER PUBLICATIONS

International Searching Authority, "International Search Report and Written Opinion," issued in connection with International Patent Application No. PCT/US2019/039708, dated Nov. 1, 2019, 11 pages.

(Continued)

*Primary Examiner* — Matthew Troutman
*Assistant Examiner* — Alexander T Rufrano
(74) *Attorney, Agent, or Firm* — HANLEY, FLIGHT & ZIMMERMAN (57) ABSTRACT

Expansion and movement joints are disclosed. An example apparatus includes a collar having a first aperture extending therethrough to receive a conduit, and a guide to receive the collar, where the guide has a second aperture that defines an inner surface of the guide, and where the inner surface of the (Continued)

guide is larger than an outer surface of the collar to define a gap therebetween.

15 Claims, 5 Drawing Sheets

(56) References Cited

U.S. PATENT DOCUMENTS

| | | | |
|---|---|---|---|
| 2,620,208 A | 12/1952 | Patch et al. | |
| 2,985,473 A * | 5/1961 | Parker | F16L 5/06 |
| | | | 277/606 |
| 3,503,632 A * | 3/1970 | Karlheinz | F16L 23/04 |
| | | | 285/48 |
| 4,331,338 A * | 5/1982 | Caldwell | F24F 13/0254 |
| | | | 277/606 |
| 4,385,777 A * | 5/1983 | Logsdon | F16L 5/10 |
| | | | 285/46 |
| 4,747,624 A * | 5/1988 | Faber | F16L 27/1021 |
| | | | 277/625 |
| 5,014,999 A * | 5/1991 | Makhobey | F16J 15/441 |
| | | | 277/422 |
| 5,261,633 A * | 11/1993 | Mastro | F16L 3/18 |
| | | | 248/68.1 |
| 6,942,452 B2 * | 9/2005 | Bruno | F01D 11/005 |
| | | | 277/606 |
| 7,478,839 B2 * | 1/2009 | Barber | F16L 27/125 |
| | | | 277/650 |
| 7,828,298 B2 * | 11/2010 | Cummings | F16L 5/04 |
| | | | 277/502 |
| 8,047,579 B2 | 11/2011 | Taillon | |
| 8,196,934 B2 * | 6/2012 | Do | F16J 15/441 |
| | | | 415/214.1 |
| 9,091,349 B2 * | 7/2015 | Krowech | F16J 15/164 |
| 9,920,859 B2 * | 3/2018 | Perrigo | B64D 45/02 |
| 10,221,994 B2 * | 3/2019 | Baiera | F16L 3/237 |
| 10,632,594 B2 * | 4/2020 | Short | F16L 3/16 |
| 10,830,077 B2 * | 11/2020 | Dunnigan | F01D 11/003 |
| 2003/0132593 A1 | 7/2003 | Ross et al. | |
| 2008/0116687 A1 * | 5/2008 | Filippi | F16L 19/00 |
| | | | 285/231 |
| 2011/0123319 A1 * | 5/2011 | Eastwood | F01D 11/003 |
| | | | 277/654 |
| 2011/0254262 A1 | 10/2011 | Manning | |
| 2013/0313787 A1 * | 11/2013 | Fujiki | B60R 16/0222 |
| | | | 277/606 |

FOREIGN PATENT DOCUMENTS

| | | |
|---|---|---|
| DE | 10 2016 100 598 A1 | 7/2017 |
| GB | 1489719 | 10/1977 |

OTHER PUBLICATIONS

"Link Seal," Jul. 8, 2017, Youtube, Retrieved from the Internet <https://www.youtube.com/watch?v=m5VpLPSqD5A> 2 pages.
The International Bureau of WIPO, International Preliminary Report on Patentability, issued in connection with Application No. PCT/US2019/039708, dated Jan. 5, 2021, 8 pages.
European Patent Office, Supplementary Partial European Search Report, issued in connection with Application No. EP 19 83 1410, dated Feb. 2, 2022, 12 pages.
Canadian Intellectual Property Office, "First Office Action," issued in connection with Canadian Patent Application No. 3,105,017, dated Feb. 28, 2022, 3 pages.
European Patent Office, "The Extended European Search Report," issued in connection with European Patent Application No. 19831410.6, dated Jun. 10, 2022, 15 pages.
European Patent Office, "Communication pursuant to Rules 70(2) and 70a(2) EPC," issued in connection with European Patent Application No. 19831410.6, dated on Jun. 28, 2022, 1 page.
Canadian Intellectual Property Office, "Second Office Action," issued in connection with Canadian Application No. 3,105,017, dated Nov. 9, 2022, 5 pages.
Canadian Intellectual Property Office, "Notice of Allowance," issued in connection with Canadian Application No. 3,105,017, dated Aug. 4, 2023, 1 page.

* cited by examiner

EXPANSION AND MOVEMENT JOINTS

RELATED APPLICATION

This patent claims priority to, and the benefit of, International Patent Application No. PCT/US19/39708, which was filed on Jun. 28, 2019, and U.S. Provisional Patent Application Ser. No. 62/694,275, which was filed on Jul. 5, 2018. International Patent Application No. PCT/US19/39708 and U.S. Provisional Patent Application Ser. No. 62/694,275 are hereby incorporated herein by reference in their entireties.

FIELD OF THE DISCLOSURE

This disclosure relates generally to industrial pipe joints and, more particularly, to expansion and movement joints.

BACKGROUND

In various industrial processes, pipes (e.g., pipe conduits, etc.) are used to carry and/or provide fluids throughout different areas of a facility. Accordingly, the pipes are joined, mounted and/or constrained at different locations of the facility via joints. However, the pipes can be subjected to movement (e.g., lateral, axial and/or radial movement) and/or changes in size, which can result from thermal expansion or contraction resulting from fluid flowing therethrough. Further, other sources may also impart detrimental effects to joints (e.g., outer temperature change and/or mechanical effects such as a change in pressures or an external source, etc.). As a result, the joints associated with the pipes can be damaged or compromised.

To prevent damage to the aforementioned joints that couple and mount the pipes, some known systems employ bellows-type or belt expansion and movement joints. However, these known solutions can be relatively costly and may also increase an overall length of a joint.

The figures are not to scale. Instead, the thickness of the layers or regions may be enlarged or diminished in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Expansion and movement joints are disclosed. Some known industrial systems typically employ piping coupled and mounted by joints, such as bellows-type joints or belt expansion joints, to accommodate for thermal expansion and contraction of pipes and associated structures. However, these joint types can be relatively expensive and time-consuming to install. Further, these joints can sometimes be susceptible to premature wear and/or failure based on a degree of motion or expansion of pipes coupled or mounted thereto.

Examples disclosed herein enable a cost-effective, reliable, robust and relatively easy to manufacture and install joint system that can accommodate both movement and size changes (e.g., due to thermal expansion or contraction) of a conduit (e.g., a pipe, a duct, a channel, or the like). Examples disclosed herein implement a collar (e.g., a collar box, a shoulder, a sleeve, etc.) having a first aperture to receive a conduit (e.g., a pipe, a pipe conduit, a pipework, a pipeline, a duct, etc.). The collar is to be received and/or enclosed by a guide (e.g., an enclosed guide sleeve, a guide box) having a second aperture. The second aperture defines an inner surface of the guide that is wider or larger than an outer surface of the collar to enable movement of the collar within the guide. In some examples, the guide includes a third aperture wider or larger than the first aperture to surround the conduit and define a range of motion of the conduit along with the collar. In some examples, any of the aforementioned apertures might not be an annulus, but might have a shape different from a circular opening (e.g., an elliptical or polygonal window, such as a triangular, rectangular, pentagonal, hexagonal, etc.).

In some examples, the collar is at least partially disposed within the guide. In particular, the collar can be captivated by an enclosure defined by the guide (e.g., a housing, an enclosure or box-like structure defined by the guide). In some examples, the collar also defines a partially enclosed structure (e.g., a housing). In some such examples, the collar is movable within and/or is guided by the partially enclosed structure. Additionally or alternatively, the guide has and/or defines a sliding surface for the collar to slide along. In some examples, the guide and/or collar is generally cylindrical in shape (e.g., defines a cylindrical body or overall shape, exhibits a cylindrical shape). In some examples, the first aperture of the collar defines a precision fit with an outer surface of the conduit (e.g., within 2% of an outer diameter of the conduit). In some examples, a seal is implemented to at least partially seal the collar to the conduit and/or the guide.

As used herein, the term "conduit" refers to a longitudinally extending structure to carry and/or support movement of objects and/or fluids disposed within. Accordingly, the term "conduit" can refer to a structure with an internal cavity (e.g., a partially extending internal cavity) that extends along a longitudinal length of the structure. As used herein, the term "collar" refers to a device, component and/or assembly to surround and/or envelope at least a portion of another object. As used herein, the term "joint" refers to a point and/or location in which the conduit is constrained and/or joined. Accordingly, the term "joint" can refer to a mount (e.g., to join the conduit to a stationary structure), a straight joint, an angled joint, an elbow joint, etc. As used herein, stating that first and second objects or surfaces are "parallel" means that the first and second objects or surfaces are within 10 degrees of one another.

Figure 1:
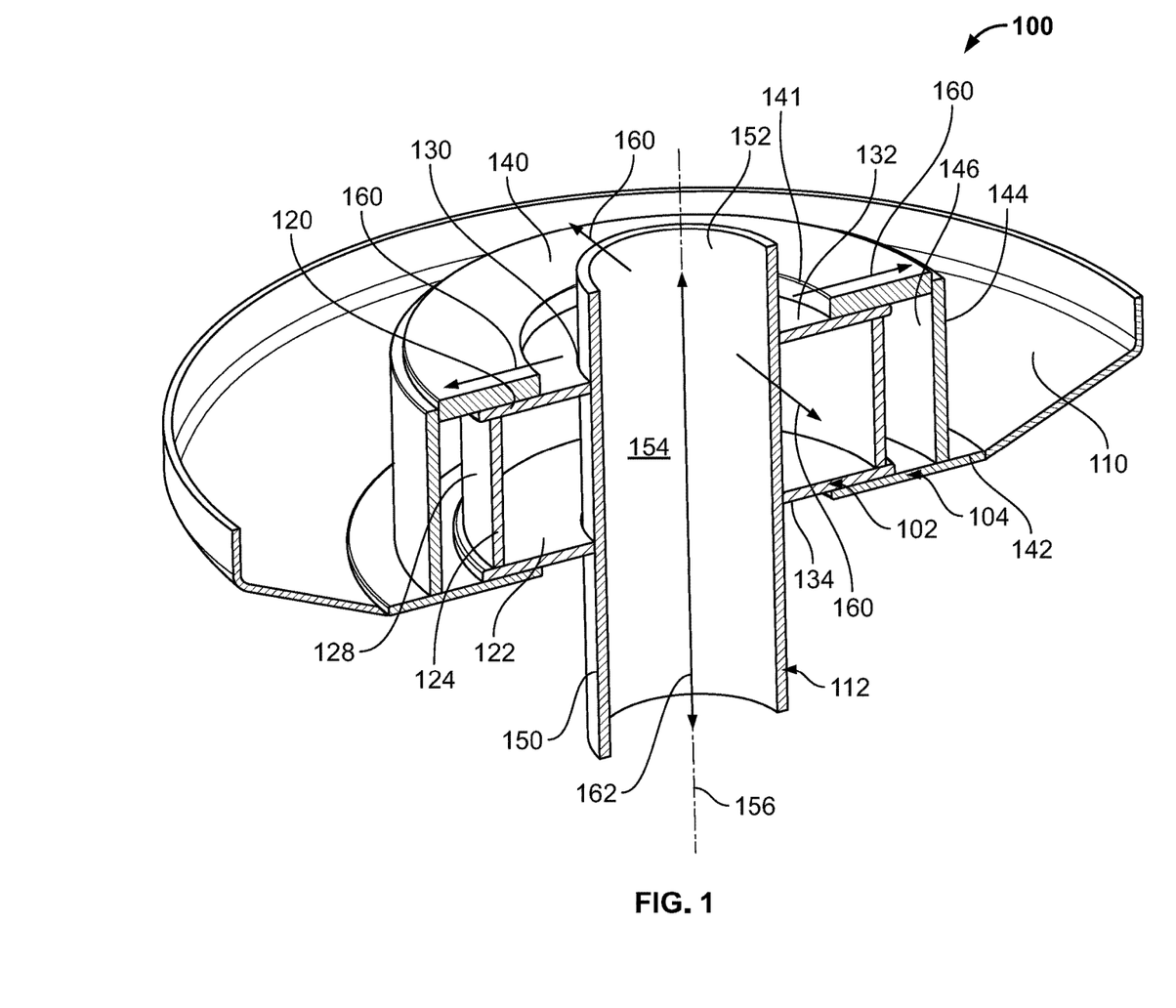
FIG. 1 is a perspective view in section of an example expansion and movement joint in accordance with teachings of this disclosure.

FIG. 1 is a perspective view in section of an example expansion and movement joint 100 in accordance with teachings of this disclosure. The expansion and movement joint 100 of the illustrated example includes a collar (e.g., a sleeve, a sliding sleeve, a shoulder, a shoulder mount, a collar box, a collar enclosure, means for receiving a conduit, etc.) 102, a guide (e.g., a means for captivating, a guide for captivating, means for constrained movement, etc.) 104 and a mount 110. In particular, the example guide 104 is fixed to the mount 110 which, in turn, is to be rigidly coupled to a stationary fixture (e.g., a wall or support of a facility, etc.). As can be seen in the illustrated example of FIG. 1, the collar 102 is at least partially enclosed within the guide 104. Further, the collar 102 surrounds and/or couples to a conduit (e.g., a pipe, a fluid delivery conduit, a cable conduit, etc.) 112.

In the illustrated example, the collar 102 includes a first span wall (e.g., an upper wall an upper surface wall, an upper ring) 120, a second span wall (e.g., a lower wall, a lower surface wall, a lower ring) 122 and a side wall (e.g. a lateral wall) 124 extending between the first and second span walls, 120, 122. In particular, the first span wall 120, the second span wall 122, and the side wall 124 define a generally cylindrical shape of the collar 102 in this example. The side wall 124 of the illustrated example defines an outer surface 128. Further, the collar 102 includes an aperture 130 that longitudinally extends through both the first and second span walls 120, 122. In this example, the first and second span walls 120, 122 define surfaces 132, 134. In some other examples, the side wall 124 is not implemented and the the first and second span walls 120, 122 are combined into a single plate, for example. Accordingly, multiple ones of this single plate can be placed in series (e.g., stacked on top of one another) to define a relatively stable collar structure.

In the illustrated example of FIG. 1, the guide 104, which is generally cylindrical shaped in this example, includes a first span wall (e.g., an upper wall) 140, a second span wall (e.g., a lower wall) 142, and a sidewall 144 extending between the first and second span walls 140, 142. Further, the guide 104 includes an aperture 141. In this example, the sidewall 144 defines a corresponding inner surface 146 that faces toward the outer surface 128 of the collar 102. In some examples, the guide 104 exhibits a box-like and/or enclosed structure. In other words, the guide 104 can at least partially enclose the collar 102.

As can be seen in the illustrated example of FIG. 1, the conduit 112 includes an outer surface 150 and an inner surface 152, which at least partially defines an internal volume 154. Further, the conduit 112 includes a longitudinal axis (e.g., a center axis) 156 extending along a length of the conduit 112. As used herein, the terms "longitudinal" and "longitudinally extending" refer a direction generally defined by the axis 156. However, the terms "longitudinal" and "longitudinally extending" can also refer to axes associated with the collar 102 or the guide 104, or axes of respective openings thereof.

To contact and at least partially restrain the conduit 112, the aperture 130 of the collar 102 surrounds and/or contacts the outer surface 150 of the conduit 112. In this example, the aperture 130 has a tight precision fit with the outer surface 150 so that movement of the conduit 112, in turn, causes movement of the collar 102. For example, the aperture 130 can have a diameter that is within a range (e.g., a tolerance range, an error range, etc.) of 2% of an outer diameter of the conduit 112. In some examples, the conduit 112 is coupled and/or attached to the collar 102. In some such examples, the conduit 112 can be mechanically or chemically fastened (e.g., via mechanical or chemical fasteners, etc.). In some examples, the collar 102 is detachably coupled to the conduit 112 such that excess displacement, force and/or movement causes de-coupling therefrom. Additionally or alternatively, the collar 102 and the conduit 112 are magnetically coupled (e.g., via magnets and/or magnetized portions).

To accommodate for movement and/or size changes (e.g., due to thermal expansion or contraction) of the conduit 112 and, thus, mitigate any potential damage to the expansion and movement joint 100, the collar 102 can move, expand and/or displace within the guide 104. In particular, the outer surface 150 of the collar 102 is smaller (e.g., has a smaller diameter) than the inner surface 146 of the guide 104, thereby defining a gap therebetween in which the collar 102 can move within the guide 104. In this example, the collar 102 and the conduit 112 can move and/or expand along multiple lateral directions generally indicated by arrows 160. In particular, the example conduit 112 and, thus, the collar 102 move in a direction that is non-parallel (e.g., perpendicular) with the axis 156. In this example, the conduit 112 and the collar 102 can be moved laterally until the outer surface 150 of the collar 102 contacts the aperture 141, thereby defining a movement range (e.g., a relative range of motion) of the conduit 112 and the collar 102. In other examples, a movement range of the collar 102 within the guide 104 can be defined by the lateral wall 124 or another outwardly extending portion of the collar 102 with the inner surface 146 of the guide 104. Additionally or alternatively, the collar 102 changes size along with (e.g., expands with) the conduit 112 (e.g., during thermal expansion or contraction, etc.). In particular, at least one of the span walls 120, 122 can expand (or contract) along with the conduit 112, for example. In some examples, the collar 102 can accommodate for movement and/or expansion of the conduit 112 along a direction generally indicated by a double arrow 162. In some examples, gaps associated with the guide 104 and/or the collar 102 may be insulated and/or applied with appropriate insulation to seal and/or affect a rate of heat transfer to a surrounding environment, but also enabling movement of the collar 102 within the guide 104.

Figure 2:
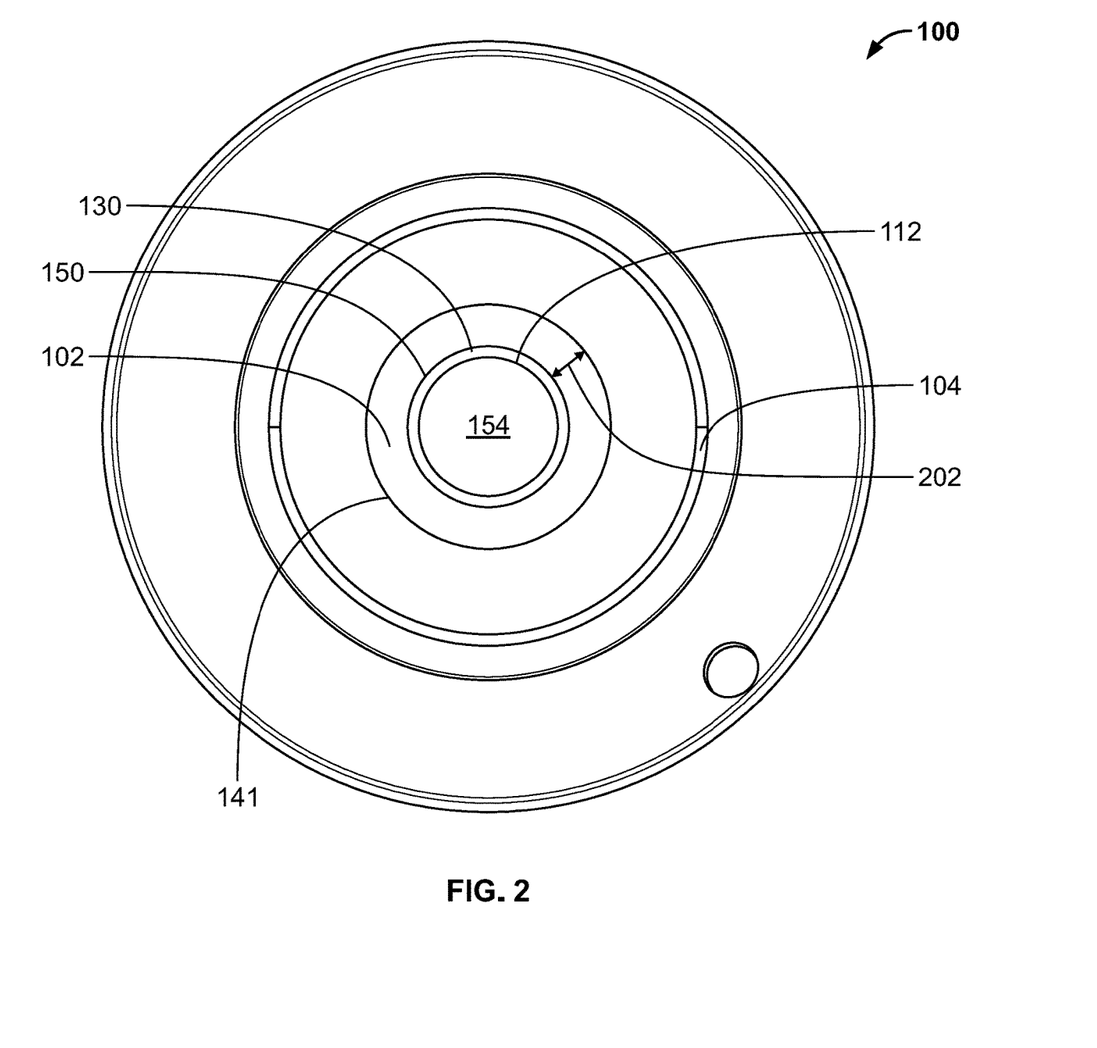
FIG. 2 is an overhead view of the example expansion and movement joint of FIG. 1.

FIG. 2 is an overhead view of the example expansion and movement joint 100 of FIG. 1. In the illustrated example of FIG. 2, the internal volume 154 of the conduit 112 is shown relative to the aperture 130 of the collar 102. In particular, the aperture 130 surrounds and/or contacts the outer surface 150 of the conduit 112. As mentioned above in connection with FIG. 1, a distance between the outer surface 150 and the aperture 141 of the guide 104 defines a range of motion of the conduit 112 along with the collar 102, as generally indicated by a double arrow 202.

While examples disclosed herein are shown with generally circular/concentric layouts, any appropriate shapes and/or perimeters can be implemented instead. For example, other geometries can be, instead, shapes including, but not limited to, rectangles, polygons, curved splines, etc.

Figure 3:
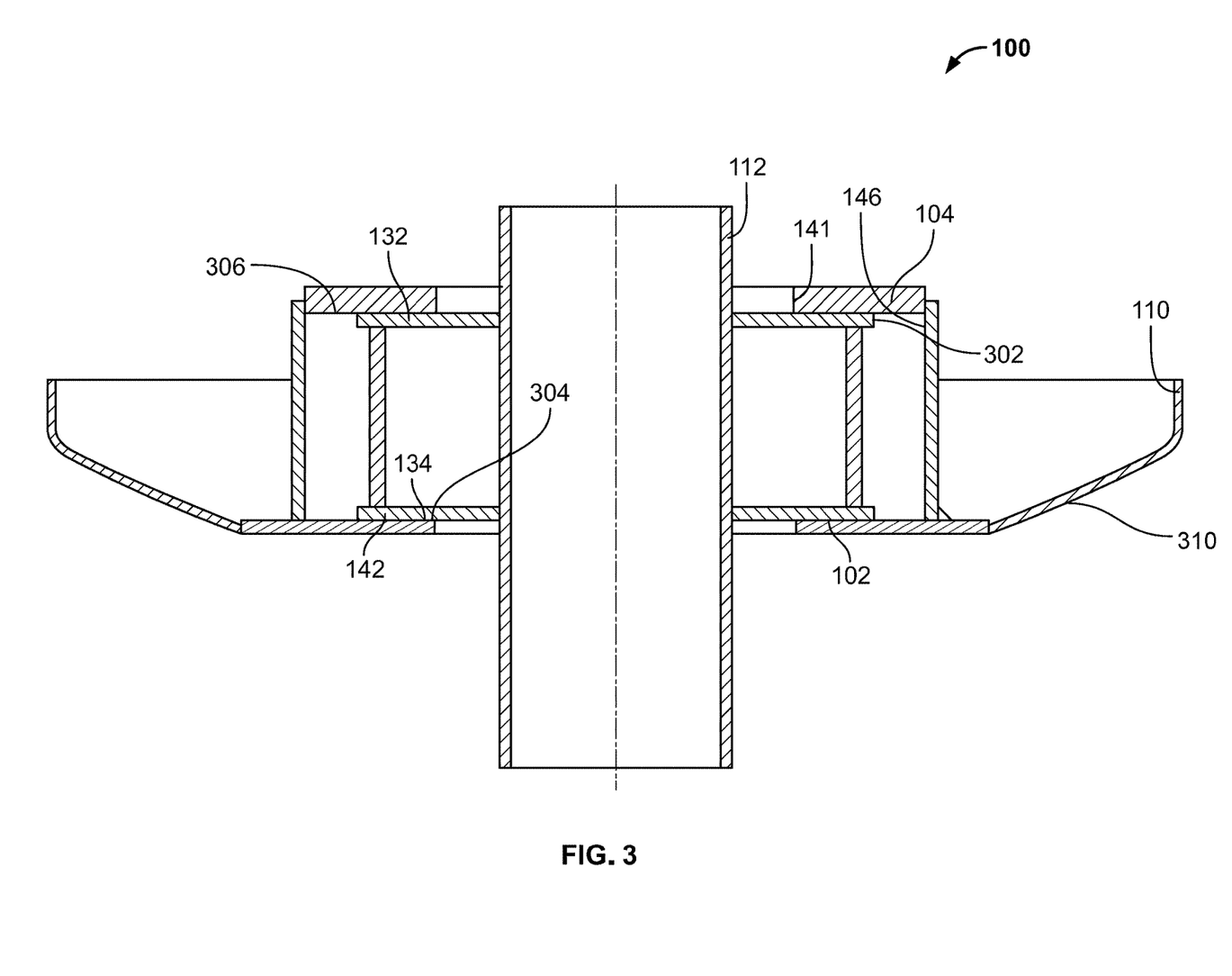
FIG. 3 is a cross-sectional view of the example expansion and movement joint of FIGS. 1 and 2 depicted in a nominal position.

FIG. 3 is a cross-sectional view of the example expansion and movement joint 100 of FIGS. 1 and 2 depicted in a nominal position. In particular, the collar 102 is shown at least partially disposed within the guide 104, and the conduit 112 is centered relative to the aperture 141 of the guide 104, for example. In the illustrated example, the collar 102 includes an outer edge 302, a surface 304 of the second span wall 142 and, likewise, a surface 306 of the first span wall 140. Further, the aforementioned mount 110 is rigidly coupled (e.g., welded) to the guide 104. In this example, the mount 110 is used to mount and align the expansion and movement joint 100.

To enable the collar 102 to move within the guide 104, the surface 134 of collar 102 is caused to slide along the internal surface 304 of the guide 104 when the conduit 112 is moved. In some other examples, the surface 132 of the collar 102 slides along the surface 306 of the guide 104, thereby vertically restraining (in the view of FIG. 3) the collar 102 relative to the guide 104. Accordingly, the collar 102 can slide relative to the guide 104 along one or multiple surfaces. In other words, at least one engagement or contact surface of the collar 102 enables the collar 102 to slide along a sliding surface (e.g., a means for sliding) of the guide 104. The sliding surface can include carbon steel, stainless steel, etc. Further, the sliding surface may be applied with a surface finishes to facilitate sliding. Additionally or alternatively, the sliding surface could be coated with a paint or a primer. In some examples, the sliding surface can be lubricated. In other examples, a separate wear pad made from plastic, Teflon™, or a special metal alloy can be implemented. Any of these aforementioned features could be used in combination with one another to facilitate sliding.

In some examples, a gap between the outer edge 302 of the collar 102 and the inner wall 146 of the guide 104 defines a lateral range of movement and/or translation of the collar 102 along with the conduit 112. In some such examples, contact of the collar 102 with the guide 104 limits motion of the collar 102. In some examples, at least one of the collar 102 or the guide 104 is at least partially composed of steel (e.g., stainless steel, 300 series stainless steel, etc.). In some examples, the guide 104 is at least partially composed of carbon steel. Additionally or alternatively, the conduit 112 is at least partially composed of steel. However, any appropriate type of material can be implemented instead. In some examples, a bend or inclined ramp 310 of the mount 110 provides additional resistance, dampening and/or sound reduction when the conduit 112 is moved and/or changes in size.

Figure 4:
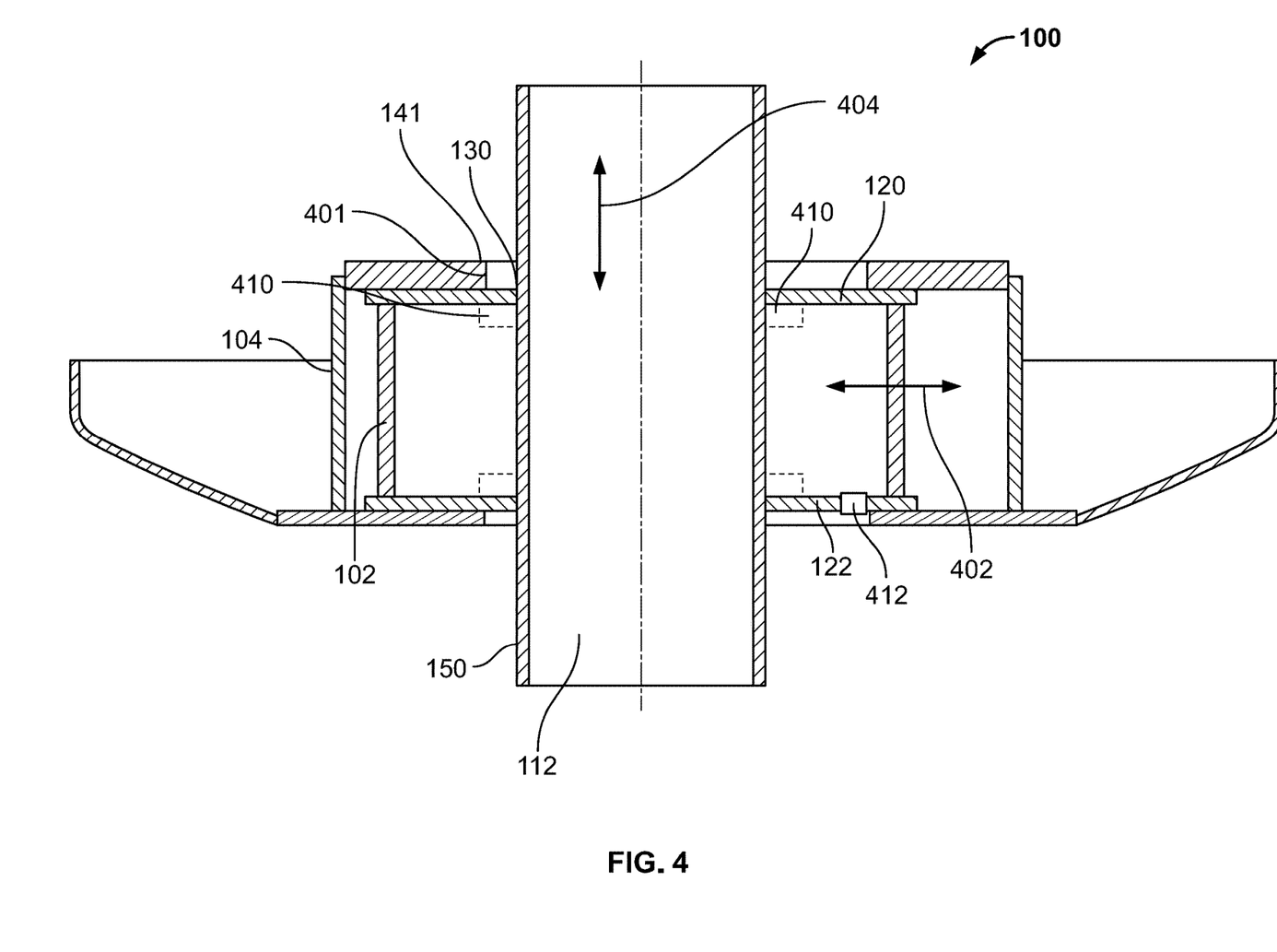
FIG. 4 is a cross-sectional view of the example expansion and movement joint of FIGS. 1 and 2 depicted in a shifted position.

FIG. 4 is a cross-sectional view of the example expansion and movement joint 100 of FIGS. 1-3 depicted in a shifted position. In contrast to the position shown in FIG. 3, the example joint 100 is shown with the collar 102 and the conduit 112 moved to an off-center position relative to the aperture 141 of the guide 104. In particular, the collar 102 has moved relative to the guide 104 such that the outer surface 150 of the conduit 112 is relatively closer to an edge 401 of the guide 104 in comparison to the example of FIG. 3. In this example, movement and/or a size change of the conduit 112 is accommodated, as generally indicated by an arrow 402. In some examples, top and bottom movement (in the view of FIG. 4) of the conduit 112 is also accommodated, as generally indicated by an arrow 404. In some such examples, the conduit 112 is not coupled or fastened to the collar 102 at the aperture 130.

In some other examples, seals 410 are implemented to at least partially seal (e.g., hermetically seal) a portion of the collar 102 and/or the guide 104. For example, the seals 410 are placed at an interface between the collar 102 and the conduit 112. In particular, the seals 410 can be mounted to the first and second span walls 120, 122 of the collar 102 to seal to the conduit 112, for example. Additionally or alternatively, the collar 102 and/or the guide 104 include an opening (e.g., an external opening) 412, which may function as a drain hole or a fluid pressure relief, for example.

Figure 5:
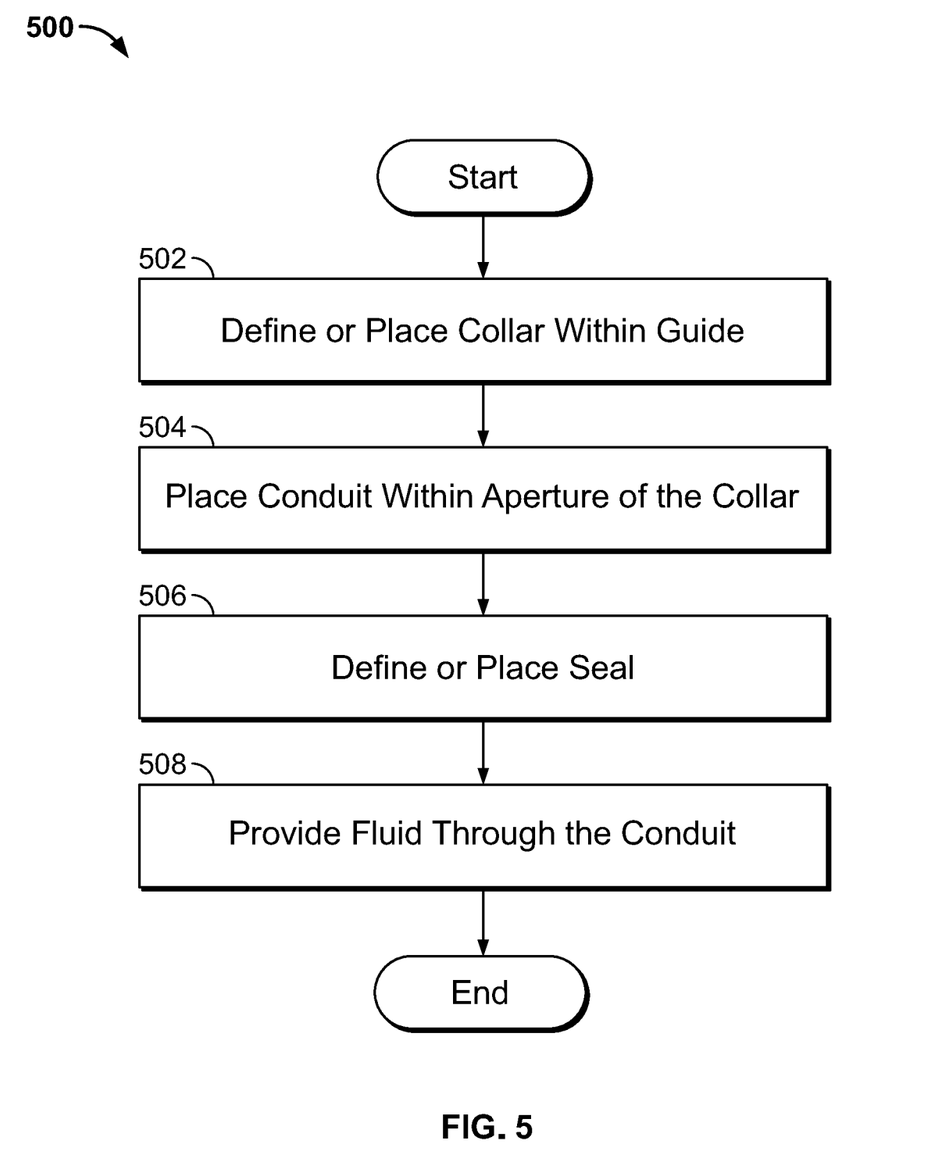
FIG. 5 is a flowchart representative of an example method to implement examples disclosed herein.

FIG. 5 is a flowchart representative of an example method 500 to implement examples disclosed herein. In this example, the collar 102 is being implemented onto a conduit to enable movement and/or thermal size differences of the conduit 112 to be accommodated to reduce (e.g., eliminate) damage and/or compromised operation of a conduit joint, such as the example joint 100 shown and described above in connection with FIGS. 1-4.

At block 502, the collar 102 is placed within and/or defined in the guide 104. In this example, the collar 102 is positioned within the guide 104. However, in other examples, the collar 102 is manufactured with (e.g., co-molded with, pre-assembled with, etc.) the guide 104. Additionally or alternatively, the collar 102 is at least partially integrated with the guide 104.

At block 504, the conduit 112 is placed and/or assembled to the aperture 130 of the collar 102. In particular, the outer surface 150 of the conduit 112 is inserted into the aperture 130 of the collar 102 using a relatively tight tolerance fit. In some other examples, the conduit 112 is placed within the collar 102 prior to placing the collar 102 within the guide 104. In some examples, the guide 104 is assembled after placement of the collar 102 along within the guide 104. For example, a portion (e.g., the span wall 140) of the guide 104 can be coupled and/or welded onto the guide 104 after the collar 102 has been placed into the guide 104 to enclose the guide 104.

At block 506, in some examples, the seal 410 is provided to the collar 102 and/or the guide 104. In some examples, the seal 410 is co-molded and/or integrated with the collar 102.

In the illustrated example, at block 508, fluid (e.g., air, venting air, pressurized fluid, etc.) is caused to flow within the internal volume 154 of the conduit 112 and the process ends.

From the foregoing, it will be appreciated that example methods, apparatus and articles of manufacture have been disclosed that enable cost-effective and robust failure-resistant conduit couplings that can accommodate movement and/or thermal expansion/contraction of a conduit (e.g., a pipe).

This patent claims priority to, and the benefit of, U.S. Provisional Patent Application Ser. No. 62/694,275, which was filed on Jul. 5, 2018. U.S. Provisional Patent Application Ser. No. 62/694,275 is hereby incorporated herein by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown in the context of industrial piping for fluids, examples disclosed herein can be used with any type of conduit and/or longitudinally extending structure that is subject to movement and/or thermal expansion, for example.

The following claims are hereby incorporated into this Detailed Description by this reference, with each claim standing on its own as a separate embodiment of the present disclosure.

What is claimed is:

1. An apparatus comprising:
a collar having a first aperture extending therethrough to receive a conduit, the collar having span walls at different longitudinal positions of the collar and an outer wall at least partially defining an outer lateral surface of the collar, the span walls and the outer wall defining an inner cavity of the collar that surrounds at least a portion of an outer surface of the conduit;
a guide to receive the collar, the guide including a second aperture that defines an inner surface of the guide, the inner surface of the guide larger than the outer lateral surface of the collar to define a gap therebetween, the guide including a third aperture on at least one of the span walls to surround the outer surface of the conduit to define a range of movement of the conduit; and
a mount to couple the guide to a stationary structure, the mount including an inclined ramp to provide dampening when the conduit is moved.

2. The apparatus as defined in claim 1, wherein the inner surface of the guide defines a lateral wall of an enclosure to surround the collar.

3. The apparatus as defined in claim 2, wherein the collar includes a wall that at least partially defines a contact surface to enable the collar to slide along a sliding surface of the guide.

4. The apparatus as defined in claim 3, further including a surface finish applied to at least one of the sliding surface or the contact surface.

5. The apparatus as defined in claim 3, further including a wear pad to contact the contact surface.

6. The apparatus as defined in claim 1, wherein the span walls at least partially define a cylindrical shape of the collar.

7. The apparatus as defined in claim 1, further including a seal to contact the conduit and at least one of the guide or the collar when the collar is placed in the guide.

8. The apparatus as defined in claim 1, wherein at least one of the collar or the guide includes an external opening.

9. A method comprising:
defining or placing a collar within a guide, the collar movable within the guide and including a first aperture to receive a conduit, the guide having a second aperture that defines an inner surface of the guide, the inner surface of the guide larger than an outer surface of a lateral wall of the collar to define a gap between the guide and the collar, the collar having first and second span walls at different positions along a longitudinal direction thereof, the lateral wall and the first and second span walls defining an inner cavity of the collar that at least partially surrounds an outer surface of the conduit; and
coupling the guide to a stationary structure via a mount, the mount including an inclined ramp to provide dampening when the conduit is moved.

10. The method as defined in claim 9, further including placing the conduit within the first aperture.

11. The method as defined in claim 10, wherein the conduit is placed into the first aperture prior to defining or placing the collar within the guide.

12. The method as defined in claim 9, further including placing a seal between the first aperture and the conduit.

13. The method as defined in claim 9, further including enclosing the guide after defining or placing the collar within the guide.

14. An apparatus comprising:
means for receiving a conduit, the means for receiving the conduit having first and second span walls at different positions along a longitudinal direction thereof, the means for receiving the conduit including an outer lateral wall that extends between the first and second span walls, the outer lateral wall and the first and second span walls defining an inner cavity of the means for receiving the conduit that surrounds at least a portion of an outer surface of the conduit;
means for captivating the means for receiving the conduit; and
means for coupling the means for captivating to a stationary structure, the means for coupling including an inclined ramp to provide dampening when the conduit is moved.

15. The apparatus as defined in claim 14, wherein the means for receiving the conduit includes means for sliding.

* * * * *